(12) United States Patent  
Hano et al.

(10) Patent No.: US 8,497,034 B2
(45) Date of Patent: Jul. 30, 2013

(54) ALKALINE BATTERY

(75) Inventors: Masatoshi Hano, Osaka (JP); Yasuhiko Syoji, Osaka (JP)

(73) Assignee: Panasonic Corporation, Osaka (JP)

( * ) Notice: Subject to any disclaimer, the term of this patent is extended or adjusted under 35 U.S.C. 154(b) by 116 days.

(21) Appl. No.: 13/005,958

(22) Filed: Jan. 13, 2011

(65) Prior Publication Data

US 2011/0206983 A1 Aug. 25, 2011

(30) Foreign Application Priority Data

Feb. 19, 2010 (JP) ................................. 2010-034762

(51) Int. Cl.
*H01M 2/00* (2006.01)
(52) U.S. Cl.
USPC ........... 429/163; 429/134; 429/164; 429/166; 429/167; 429/168; 429/169; 429/170; 429/175; 429/300
(58) Field of Classification Search
USPC ................. 429/129, 132, 134–135, 163–170, 429/175–176, 300
See application file for complete search history.

(56) References Cited

U.S. PATENT DOCUMENTS

2002/0012838 A1* 1/2002 Tsukada et al. ............... 429/176
2005/0271941 A1* 12/2005 Bushong et al. ........... 429/218.1

FOREIGN PATENT DOCUMENTS

| JP | 56-127672 | 9/1981 |
| JP | 10-321198 | 12/1998 |
| JP | 2007-157635 A | 6/2007 |
| JP | 2008-130429 | 6/2008 |

OTHER PUBLICATIONS

Chinese Office Action issued on Mar. 29, 2013 in corresponding Chinese Application No. 201110043984.8.

* cited by examiner

*Primary Examiner* — Patrick Ryan
*Assistant Examiner* — Ben Lewis
(74) *Attorney, Agent, or Firm* — McDermott Will & Emery LLP

(57) ABSTRACT

An alkaline battery including a positive electrode of a hollow cylindrical shape disposed in contact with an inner surface of a bottomed cylindrical battery case, a gelled negative electrode, a separator, and an alkaline electrolyte. The separator includes a cylindrical separator disposed in contact with the inner side surface of the positive electrode, and a bottom separator covering an opening of the cylindrical separator in the bottom side of the battery case. The bottom of the battery case includes: an annular base portion for supporting the positive electrode; an annular intermediate portion provided inwardly of the base portion, for supporting the bottom separator; and a terminal portion protruding outwardly from the intermediate portion. The intermediate portion has an inclined surface on the inner bottom surface of the battery case, the inclined surface being inclined downwardly from the base portion toward the terminal portion.

8 Claims, 7 Drawing Sheets

US 8,497,034 B2

ALKALINE BATTERY

FIELD OF THE INVENTION

The invention relates to alkaline batteries, and specifically relates to an improvement to a battery case for alkaline batteries.

BACKGROUND OF THE INVENTION

Various improvements have been proposed for a battery case for housing a power generating unit of a battery.

For example, Japanese Unexamined Utility Model Publication No. Sho 56-127672 proposes improving a bottomed prismatic battery case made of resin (hereinafter "resin case") for lead storage batteries. Specifically, the resin case houses an electrode assembly formed by laminating a plurality of positive electrodes and negative electrodes with a separator interposed between the positive electrode and the negative electrode. In order to prevent part of electrode active material separated from one of the positive and negative electrodes and dropped on the bottom of the resin case, if any, from coming in contact with the other electrode, the bottom of the resin case is provided with a space for receiving the dropped material. The space is obtained by forming a recessed portion by providing a slope on the bottom of the resin case.

Japanese Laid-Open Patent Publication No. 2008-130429 proposes providing a step portion on the bottom of a bottomed cylindrical battery case made of metal for alkaline batteries, the step portion being provided between a base portion on which a hollow cylindrical positive electrode is placed, and a protruding portion (a positive electrode terminal) protruding from the base portion. This step portion has a flat surface which is perpendicular to the axis direction of the positive electrode and on which a separator is placed.

Japanese Laid-Open Patent Publication No. Hei 10-321198 proposes using a bottomed cylindrical battery case made of metal for alkaline batteries, the battery case having a thickness of the bottom of 0.130 to 0.195 mm and a thickness of the side of 0.070 to 0.195 mm, for the purpose of increasing the capacity and reducing the weight of the batteries.

However, in alkaline batteries, there is a risk in the production process thereof that, from the inner wall of the hollow cylindrical positive electrode disposed in the bottomed cylindrical battery case, part of the positive electrode is separated, and part of the separated positive electrode drops on a portion of the bottom of the battery case on which a separator is to be placed. If the dropped material remains on the portion on which a separator is to be placed, this may cause a trouble such as failure of proper insertion of the separator. Such trouble is peculiar to alkaline batteries having an inside-out structure.

In alkaline batteries disclosed in Japanese Laid-Open Patent Publication No. 2008-130429 also, the above trouble may occur as a result that the dropped material remains on the step portion of the battery case. Even when the battery case disclosed in Japanese Laid-Open Patent Publication No. Hei 10-321198 is used in alkaline batteries, there is a risk that the above trouble occurs.

BRIEF SUMMARY OF THE INVENTION

One aspect of the invention is an alkaline battery comprising a bottomed cylindrical battery case, a positive electrode of a hollow cylindrical shape disposed in contact with an inner surface of the battery case, a negative electrode in the form of gel disposed in a hollow portion of the positive electrode, a separator interposed between the positive electrode and the negative electrode, and an alkaline electrolyte. The separator includes a cylindrical separator disposed in contact with an inner side surface of the positive electrode, and a bottom separator covering an opening of the cylindrical separator in the bottom side of the battery case. The bottom of the battery case includes an annular base portion for supporting the positive electrode, an annular intermediate portion provided inwardly of the base portion, for supporting the bottom separator, and a terminal portion provided so as to protrude outwardly from the intermediate portion. The intermediate portion has an inclined surface on an inner bottom surface of the battery case, the inclined surface being formed so as to incline outwardly from the base portion toward the terminal portion.

The invention is applicable to D, C, AA and AAA size alkaline batteries (LR20, LR14, LR6 and LR03 batteries).

According to the invention, it is possible to provide a highly reliable battery in which foreign matters are unlikely to remain on a portion of the bottom of the battery case on which a separator is to be placed.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Embodiment 1

Figure 1:
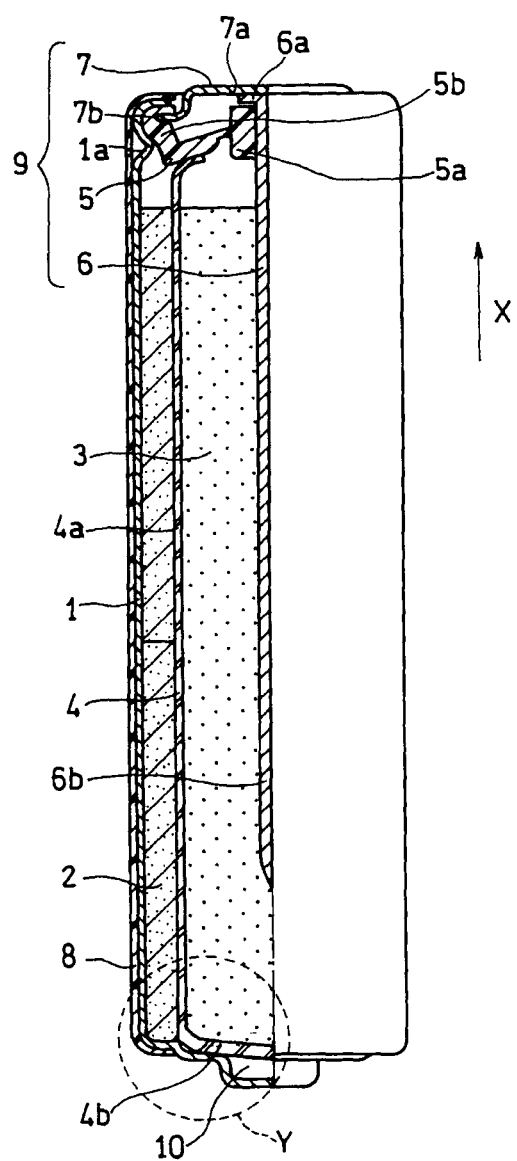
FIG. 1 is a front view, partially in section, of an alkaline battery according to Embodiment 1 of the invention.

An alkaline battery according to one embodiment of the invention is described below with reference to FIG. 1. FIG. 1 is a front view, partially in section, of the alkaline battery. The direction of arrow X in FIG. 1 shows the direction along the axis direction of the battery case.

A hollow cylindrical positive electrode 2 is disposed in close contact with the inner surface of a bottomed cylindrical battery case 1 having a tubular side, a bottom, and an opening.

The positive electrode 2 includes, for example, a positive electrode active material, a conductive agent, and an alkaline electrolyte. The positive electrode active material may be, for example, manganese dioxide in the form of powder. A preferred manganese dioxide is electrolytic manganese dioxide, which is comparatively inexpensive and easily available. The average particle size of the manganese dioxide is, for example, 30 to 70 μm. The average particle size of the manganese dioxide is measured by using, for example, a laser diffraction/scattering particle size distribution analyzer LA-920 available from Horiba, Ltd. In order to makes it more difficult for part of the positive electrode from being separated, it is preferable to adjust the amount of large-size particles having a particle size of 200 μm or more in the manganese dioxide powder to 0.2% by weight or less.

The amount of the conductive agent in the positive electrode 2 is preferably 3 to 10 parts by weight per 100 parts by weight of the positive electrode active material. The conductive agent may be, for example, graphite in the form of powder. The average particle size of the graphite is, for example, 5 to 20 μm.

The ratio B/A of an average particle size B of the graphite to an average particle size A of the manganese dioxide is preferably ¼ to ⅛, and more preferably ⅕ to ⅐. When the ratio B/A is within the above ranges, the surfaces of the manganese dioxide particles are more likely to be uniformly coated with graphite, and thus the slidability of a fragment separated from the positive electrode is improved, allowing the fragment of positive electrode to smoothly move to the terminal portion of the battery case.

The alkaline electrolyte may be, for example, an aqueous solution containing potassium hydroxide and zinc oxide. The concentration of the potassium hydroxide in the alkaline electrolyte is preferably 30 to 40% by weight. The concentration of the zinc oxide in the alkaline electrolyte is preferably 1 to 5% by weight.

In order to reduce the separation of part of the positive electrode from the inner wall of the positive electrode in the production process of an alkaline battery, it is preferable to adjust the density of the molded positive electrode. For example, the filling density of the manganese dioxide in the positive electrode is preferably 2.75 to 3.05 g/cm$^3$, in view of the strength and adhesion of the positive electrode. Here, the filling density of the manganese dioxide is an amount of the manganese dioxide per cm$^3$ of the positive electrode. The filling density of the manganese dioxide in the positive electrode is more preferably 2.85 to 3.05 g/cm$^3$, and further preferably 2.95 to 3.00 g/cm$^3$.

A gelled negative electrode 3 is filled in the hollow portion of the positive electrode 2. The negative electrode 3 includes, for example, a negative electrode active material, a gelling agent, and an alkaline electrolyte. The adding amount of the gelling agent is preferably 0.5 to 2 parts by weight per 100 parts by weight of the negative electrode active material. The adding amount of the alkaline electrolyte is preferably 40 to 60 parts by weight per 100 parts by weight of the negative electrode active material.

The negative electrode active material may be, for example, zinc or zinc alloy in the form of powder. The average particle size of the zinc or zinc alloy is, for example, 80 to 150 μm. The average particle size of the zinc or zinc alloy is measured by using, for example, a laser diffraction/scattering particle size distribution analyzer LA-920 available from Horiba, Ltd. The zinc alloy preferably contains at least one of Bi, In and Al, in view of corrosion resistance. The content of Bi in the zinc alloy is preferably 0.0025 to 0.05% by weight. The content of In in the zinc alloy is preferably 0.01 to 0.1% by weight. The content of Al in the zinc alloy is preferably 0.003 to 0.03% by weight. The ratio of elements other than zinc in the zinc alloy is preferably 0.02 to 0.08% by weight.

The gelling agent may be, for example, a polyacrylic acid salt such as sodium polyacrylate.

A separator 4 is disposed between the positive electrode 2 and the negative electrode 3. Specifically, the negative electrode 3 is filled in the separator 4 of a bottomed cylindrical shape, by which the positive electrode 2 and the negative electrode 3 are insulated from each other. The separator 4 is formed of a cylindrical separator 4a and a bottom separator 4b.

The cylindrical separator 4a is disposed in contact with the inner surface of the positive electrode 2 and provides insulation between the positive electrode 2 and the negative electrode 3. The cylindrical separator 4a is made of, for example, a mixed non-woven fabric mainly composed of polyvinyl alcohol fibers and rayon fibers. The thickness of the cylindrical separator 4a is, for example, 0.15 to 1.50 mm.

The bottom separator 4b is placed on the bottom of the battery case 1 and provides insulation between the negative electrode 3 and the battery case 1. For example, a synthetic fiber such as polyvinyl alcohol, or a kraft paper is used as the bottom separator 4b. Alternatively, a macroporous thin film (cellophane) made of regenerated cellulose with a non-woven fabric made of polyvinyl alcohol-based synthetic fibers laminated on one surface or both surfaces thereof is used. The thickness of the bottom separator 4b is, for example, 50 to 250 μm.

The opening of the battery case 1 is sealed by a sealing unit 9. The sealing unit 9 is formed of a gasket 5, a negative electrode terminal plate 7 also serving as a negative electrode terminal, and a negative electrode current collector 6. The negative electrode current collector 6 is inserted in the negative electrode 3. A shank 6b of the negative electrode current collector 6 is inserted in the through-hole provided in a central cylindrical portion 5a of the gasket 5, and a head 6a of the negative electrode current collector 6 is welded to a flat portion 7a at the center of the negative electrode terminal plate 7. The opening end of the battery case 1 is crimped over a fringe 7b at the periphery of the negative electrode terminal plate 7 with an outer circumferential cylindrical portion 5b of the gasket 5 interposed therebetween. The outer surface of the battery case 1 is covered with an external label 8.

Figure 2:
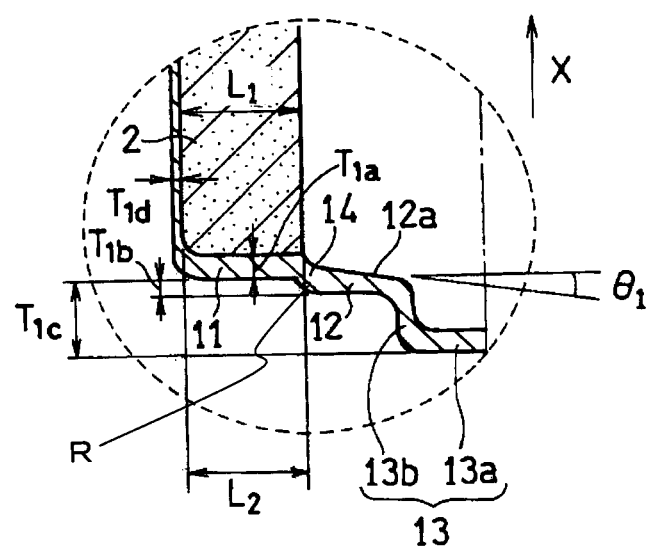
FIG. 2 is an enlarged relevant-part cross-sectional view showing a Y-portion in FIG. 1.

FIG. 2 is an enlarged relevant-part cross-sectional view showing a portion around the bottom of an alkaline battery (i.e., a Y-portion in FIG. 1).

The bottom of the battery case 1 includes: an annular base portion 11 for supporting the positive electrode 2; an annular intermediate portion 12 provided inwardly of the base portion 11, for supporting the bottom separator 4b; and a cylindrical terminal portion 13 protruding downwardly (i.e., outwardly) from the intermediate portion 12. There is a recessed portion defined by the terminal portion 13, in the interior of the battery case 1. Specifically, the terminal portion 13 is formed of a tubular side and a bottom. There is a space 10 defined by the bottom separator 4b and the terminal portion 13, in the interior of the battery.

The intermediate portion 12 has an inclined surface 12a on the inner bottom surface of the battery case 1, the inclined surface being inclined downwardly (i.e., outwardly) from the base portion 11 toward the terminal portion 13.

Since the intermediate portion has an inclined surface, even if part of the positive electrode separated from the inner wall of the positive electrode drops on the intermediate portion of the battery case in the process of fabricating a battery, the dropped material will move to the recessed portion defined by the terminal portion, without remaining on the intermediate portion of the battery case. Therefore, troubles caused by foreign matters such as the dropped material remaining on the intermediate portion of the battery case can be prevented.

Foreign matters such as the dropped material are trapped in the space 10 in the process of battery fabrication and are prevented from freely moving in the interior of the battery due to vibration or the like. Therefore, internal short circuit due to foreign matters such as the dropped material will not occur.

A step portion 14 is further provided between the base portion 11 and the intermediate portion 12.

The step portion 14 serves to stably fix the separator at a proper position on the bottom of the battery case. The step portion 14 also serves to reliably bring the separator into close contact with the lowermost portion of the positive electrode. Therefore, it will not happen that the negative electrode is forced out of the separator due to improper positioning of the separator, thus causing no internal short circuit.

The height $T_{1b}$ of the step portion 14 measured from the base portion 11 is preferably 0.1 to 0.5 mm in view of the internal volume of the battery case.

The height $T_{1b}$ of the step portion 14 measured from the base portion 11 is preferably larger than the thickness of the bottom separator 4b. When the height $T_{1b}$ is larger than the thickness of the bottom separator 4b, the lowermost portion of the positive electrode can face the negative electrode. Specifically, the entire inner surface of the positive electrode can face the negative electrode, resulting in an increased effective reaction area. In addition, the internal volume of the separator 4 is increased, and thus the amount of the negative electrode filled therein is increased. This results in a higher capacity of the battery.

There is difference in height almost all over the step portion 14. The difference in height may be provided in the direction X, or may be slightly inclined from the base portion 11 toward the intermediate portion 12.

In order to stably position the bottom separator 4b more easily, the step portion 14 is preferably provided with a rounded (R) portion at least at the lower end thereof in the intermediate portion 12 side as indicated by R in the cross-sectional view of FIG. 2.

The curvature radius of the R portion is preferably 0.1 to 0.5 mm, in view of the processability.

In order to stably place the positive electrode on the bottom of the battery case, and to allow a fragment of the positive electrode separated from the positive electrode to drop on the intermediate portion without fail and then move to the recessed portion defined by the terminal portion, it is preferable that the dimension $L_2$ of the positive electrode in the diameter direction (i.e., the difference between the outer diameter and the inner diameter of the positive electrode) is slightly smaller than or equal to the dimension $L_1$ of the base portion in the diameter direction (i.e., the difference between the outer diameter and the inner diameter of the base portion). The ratio $L_2/L_1$ of the dimension $L_2$ of the positive electrode in the diameter direction to the dimension $L_1$ of the base portion in the diameter direction is preferably 0.95 or more and 1 or less, and more preferably 0.98 or more and 1 or less.

The thickness $T_{1a}$ of the base portion 11 is preferably 0.25 to 0.50 mm, in view of the strength and internal volume of the battery case. The height $T_{1b}$ of the intermediate portion 12 measured from the base portion 11 is preferably 0.1 to 0.5 mm, in view of the internal volume of the battery case. The height $T_{1c}$ of the terminal portion 13 measured from the base portion 11 is preferably 1.4 to 3.0 mm, in view of the internal volume of the battery case.

The lower surface of the intermediate portion 12 is not inclined with respect to a plane perpendicular to the direction X, and is parallel to the lower surface of the base portion 11 and flush therewith. By configuring as above, the terminal portion 13 and the inclined surface 12a can be formed with a large internal volume ensured in the battery case 1.

In this configuration, the inclined angle $\theta_1$ of the inclined surface 12a relative to a plane perpendicular to the direction X is preferably 2 to 5°. When the inclined angle $\theta_1$ is less than 2°, the degree of inclination is insufficient, which may cause a fragment of the positive electrode to remain on the intermediate portion 12. When the inclined angle $\theta_1$ is more than 5°, the thickness of the intermediate portion 12 in the terminal portion 13 side is decreased, which may reduce the strength of the intermediate portion 12.

The battery case 1 is made of metal and also serves as a positive electrode terminal. The battery case 1 is preferably made of a steel sheet with a nickel layer formed on the surface thereof. The thickness of the nickel layer formed on the surface of the steel sheet is preferably 1 to 3 µm, in view of the electrical conductivity and corrosion resistance of the battery case. The steel sheet with a nickel layer formed on a surface thereof can be obtained by, for example, plating a steel sheet with nickel.

The steel sheet preferably contains carbon in an amount of 0.02 to 0.05% by weight, in view of the processability and strength of the steel sheet. When the steel sheet contains carbon as such, a battery case (in particular, an intermediate portion) with sufficient strength can be obtained.

In view of improving the strength of the battery can, the steel sheet preferably contains at least one of manganese and phosphorus. The manganese content in the steel sheet is preferably 0.1% by weight or more and 0.3% by weight or less. The phosphorus content in the steel sheet is preferably 0.02% by weight or more and 0.05% by weight or less.

The inner bottom surface of the battery case 1 (at least both the base portion and the intermediate portion) preferably has a carbon coating. This improves the slidability on the inner bottom surface (the inclined surface), allowing a fragment of the positive electrode dropped on the inclined surface to move to the terminal portion.

The thickness of the carbon coating is preferably 1 to 50 µm. It is preferable to use graphite to form a carbon coating. The graphite is preferably flake graphite, in view of the slidability on the surface of the carbon coating. The average particle size of the graphite is preferably 1 to 15 µm, in view of the slidability on the surface of the carbon coating.

The carbon coating can be formed by, for example, applying a paste containing graphite, such as Varniphite available from Nippon Graphite Industries, Ltd., Electrodag available from Acheson Co., and LB1000 available from TIMCAL Ltd., in an amount of 1 to 10 mg per $cm^2$, and drying the paste.

It is preferable that the inner side surface of the battery case also has the above-described carbon coating. The carbon coating is, because of its excellent electrical conductivity, capable of reducing the contact resistance between the battery case and the positive electrode, which can reduce the internal resistance of the battery.

A method for fabricating the alkaline battery of the invention is described below.

The method for fabricating the alkaline battery of the invention includes the steps of, for example:

(1) producing the battery case shown in FIG. 2;

(2) preparing positive electrode pellets each having a hollow cylindrical shape and comprising a positive electrode active material, a conductive agent, and an alkaline electrolyte;

(3) inserting the positive electrode pellets in the battery case, and press-molding the positive electrode pellets to bring them into close contact with the battery case, to produce a positive electrode of a hollow cylindrical shape;

(4) arranging a bottomed cylindrical separator in the hollow portion of the positive electrode;

(5) injecting an electrolyte into the battery case after the step (4);

(6) filling a gelled negative electrode in the hollow portion of the positive electrode with the separator interposed therebetween; and (7) sealing the battery case with a sealing unit.

[Step (1): Production of Battery Case]

Exemplary methods for producing a battery case according to the step (1) are described below.

In producing a battery case, for example, a DI (Drawing and Ironing) process or a transfer process may be employed.

In the case of employing a DI process, the method for producing a battery case includes the steps of, for example:

(A) processing a nickel-plated steel sheet into a cup shape, to give a first in-process product;

(B) subjecting the first in-process product to preliminary processing, to give a second in-process product having a protruding portion at the bottom thereof;

(C) subjecting the second in-process product to drawing by at least one drawing die and ironing by ironing dies arranged in multi-stages, and then press-molding the protruding portion, to give a battery case having the bottom shaped as shown in FIG. 2.

Here, one or more drawing dies and two or more ironing dies may be arranged in multi-stages.

The can forming process through the bottom shaping process may be performed in a single step, specifically in the step (C), by using one set of punch and die, a drawing die(s) and ironing dies.

Figure 3:
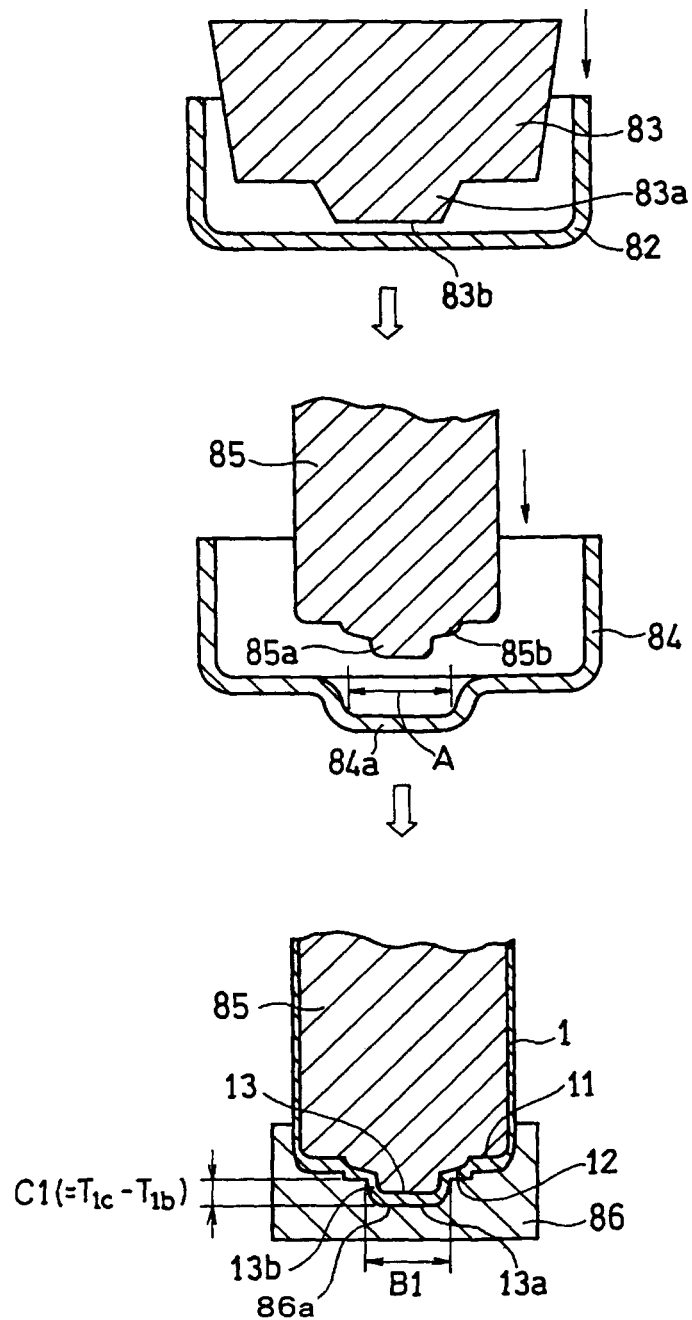
FIG. 3 is a set of schematic cross-sectional views showing a production process of the battery case in FIG. 1.

In the step (A), for example, a nickel-plated steel sheet having a thickness, for example, 0.25 to 0.50 mm is punched into the shape of a disc, and the disc is drawn into the shape of a cup, to give a cup-shaped first in-process product 82 as shown in FIG. 3. The first in-process product 82 is formed such that the nickel layer is disposed at least on the outside thereof.

The nickel-plated steel sheet is obtained by forming a nickel layer by plating on at least one surface of a steel sheet, namely, at least the surface thereof to be an outer surface of the battery case. The steel sheet may be, for example, Ni-TOP steel sheet available from Toyo Kohan Co., Ltd. The thickness of the steel sheet is, for example, 0.25 to 0.50 mm. The thickness of the nickel layer is, for example, 1 to 3 μm.

The step (B) is performed, for example, as follows.

For example, the bottom of the first in-process product 82 is pressed from inside thereof with a pre-forming punch 83 having a truncated cone-shaped protrusion 83a, as shown in FIG. 3. When pressing, a lower end surface 83b of the protrusion 83a serves as a pressure-applying surface. In this manner, a cup-shaped second in-process product 84 having a bottom with a truncated cone-shaped protrusion portion 84a is obtained. The protruding portion 84a is processed into a step portion, intermediate portion, and terminal portion, in the subsequent step (C).

The corner of the protruding portion 84a can be made thinner by decreasing the curvature radius R of the corner in the truncated cone-shaped protrusion 83a, for example, by decreasing the curvature radius R to 0.5 mm or less.

By doing this, in the subsequent step (C), the step portion, intermediate portion, and terminal portion can be easily formed, and an inclined surface can be easily provided on the intermediate portion.

The step (C) is performed, for example, as follows.

Specifically, a punch 85 and a die 86 as shown in FIG. 3 are used. The punch 85 has a protrusion 85a corresponding to the shape of the inner bottom surface of the battery case as shown in FIG. 2. The protrusion 85a includes an inclined portion 85b corresponding to the inclined surface of the intermediate portion. The die 86 has a recess 86a corresponding to the shape of the outer bottom surface of the battery case as shown in FIG. 2.

The punch 85 is inserted into the second in-process product 84 through the opening thereof such that the direction of the protrusion 85a of the punch 85 coincides with the protruding direction of the protruding portion 84a of the second in-process product 84, and then the punch 85 and the second in-process product 84 are together passed through the drawing die(s) and ironing dies arranged in multi-stages. In this manner, the second in-process product 84 can be continuously subjected to drawing and ironing.

Next, while the second in-process product 84 having been subjected to drawing and ironing is mounted on the punch 85, the protrusion 85a of the punch 85 is pressed toward the recess 86a of the die 86. By doing this, the protruding portion 84a of the second in-process product 84 can be processed into the base portion 11, the step portion 14, the intermediate portion 12, and the terminal portion 13.

The thicknesses of the base portion 11 and a lower end surface 13a of the terminal portion 13 of the battery case 1 are almost the same as those before processed into a cup shape, that is, almost the same as the thickness of the nickel-plated steel sheet. On the other hand, the thickness of the side wall of the battery case is decreased as a result of ironing. In short, the thickness of the side wall of the battery case is smaller than that of the base portion thereof.

The ratio $T_{1a}/T_{1b}$ of a thickness $T_{1a}$ of the base portion to a thickness $T_{1b}$ of the side wall is preferably 1.2 to 5. Setting $T_{1a}/T_{1b}$ to 1.2 or higher results in a decreased thickness of the side wall of the battery case, which makes it possible to achieve a higher capacity. Setting $T_{1a}/T_{1b}$ to 5 or lower ensures sufficient thickness and strength of the side wall. $T_{1a}/T_{1b}$ can be adjusted by adequately controlling the ironing ratio, that is, by adequately setting the inner diameters of the ironing dies and the like.

The diameter A of the inner bottom surface of the protruding portion 84a of the second in-process product 84, the outer diameter B1 of the terminal portion 13, and the height C1 of the terminal portion 13 measured from the intermediate portion 12 shown in FIG. 3 preferably satisfy the relation formula: $0.92 \leq (B1+C1)/A \leq 1.12$. Here, the height C1 is equal to ($=T_{1c}-T_{1b}$) in FIG. 3. By setting A, B1 and C1 as above, the occurrence of cracks or processing creases on the side surface 13b of the terminal portion 13 can be reduced, and the contact resistance at the end surface 13a of the terminal portion 13 can be lowered.

In the case of employing a transfer process, the method for producing a battery case includes the steps of, for example:

(a) processing a nickel-plated steel sheet into a cup shape, to give an in-process product A;

(b) subjecting the in-process product A to drawing, to give an in-process product B;

(c) subjecting the in-process product B to preliminary processing, to give an in-process product C having a protruding portion at the bottom thereof; and (d) press-molding the protruding portion of the in-process product C, to give a battery case having the bottom shaped as shown in FIG. 2.

The drawing in the step (b) is preformed several times (e.g., 3 to 6 times).

In each of the steps (b) to (d), a set of die and punch is used independently, and a transfer means, such as fingers, is used to transfer the in-process products from one to the next step. By doing this, the multiple processes, specifically the steps (b) to (d), can be performed as one step.

In the step (c), a pre-forming punch having the same protrusion 83a as above is used to form a protruding portion of the same shape as the above protruding portion 84a.

In the step (d), a punch having a protrusion of the same shape as the above protrusion 85a, and a die having a recess of the same shape as the above recess 86a are used.

[Step (2): Preparation of Positive Electrode Pellets]

An example of the step (2) is described below.

A conductive agent is added to a positive electrode active material to give a mixture M. An alkaline electrolyte is added to the mixture M, and these are evenly stirred and mixed in a mixer or the like, and then compacted, to give a flake positive electrode material mixture. The flake positive electrode material mixture is then crushed and granulated to a predetermined particle size, to give a granular positive electrode material mixture (hereinafter a "particulate material mixture). The average particle size of the particulate material mixture is, for example, 0.4 to 0.7 mm. The particulate material mixture is sieved into 10 to 100 mesh size, and then press-molded into a hollow cylindrical shape, thereby to prepare a positive electrode pellet.

For example, a manganese dioxide powder (e.g., average particle size: 30 to 70 μm) is used as the positive electrode active material, and a graphite powder (e.g., average particle size: 5 to 20 μm) is used as the conductive agent. The adding amount of the conductive agent is preferably 3 to 10 parts by weight per 100 parts by weight of the positive electrode active material. The adding amount of the alkaline electrolyte is preferably 1 to 5 parts by weight per 100 parts by weight of the mixture M (i.e., 100 parts by weight of the total amount of the positive electrode active material and the conductive agent).

[Step (3): Preparation of Positive Electrode]

An example of the step (3) is described below.

Figure 4:
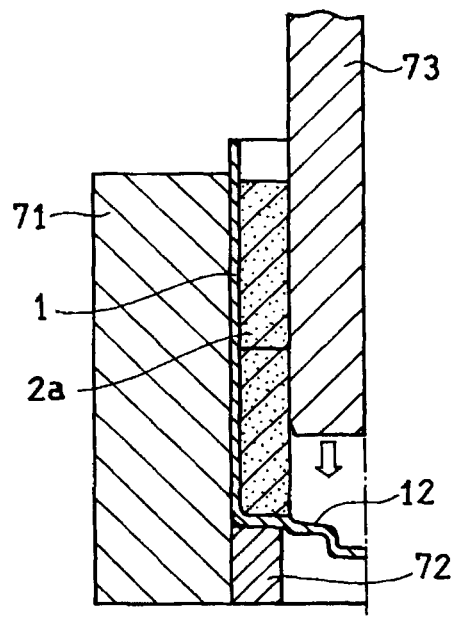
FIG. 4 is a schematic cross-sectional view showing how a pin is inserted in the hollow portions of positive electrode pellets.

A lower molding punch 72 is inserted in the hollow portion of a hollow cylindrical cartridge 71, as shown in FIG. 4. The bottomed cylindrical battery case 1 also serving as a positive electrode terminal is placed on the lower molding punch 72 inserted in the hollow portion of the cartridge 71. At this time, the base portion 11 of the bottom of the battery case 1 is mounted on the lower molding punch 72.

A plurality of the positive electrode pellets 2a (e.g., two pellets) are inserted into the battery case 1. At this time, the plurality of the positive electrode pellets 2a are stacked coaxially so that the hollow portions of the positive electrode pellets 2a are communicated with each other. In the hollow portions of the positive electrode pellets 2a, a cylindrical pin 73 having a diameter slightly smaller than the inner diameter of the positive electrode pellets 2a (e.g., a diameter smaller than the inner diameter of the positive electrode pellets 2a by 0.1 to 0.3 mm) is inserted.

Figure 5:
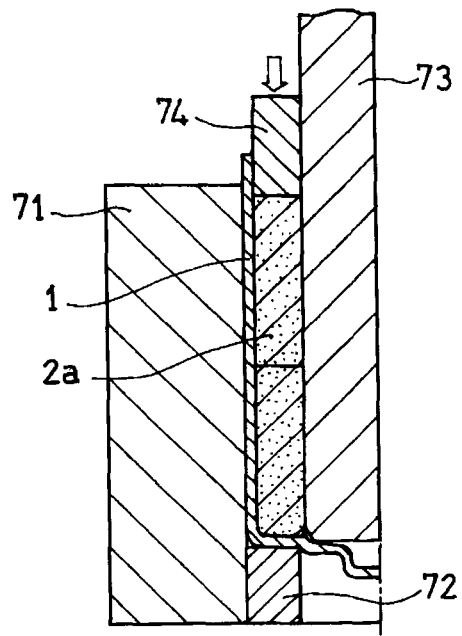
FIG. 5 is a schematic cross-sectional view showing how the positive electrode pellets are press-molded in the battery case.

Subsequently, as shown in FIG. 5, while the pin 73 is inserted in the hollow portion of a hollow cylindrical upper molding punch 74, the positive electrode pellets 2a are pressed from above with the upper molding punch 74 at a predetermined pressure (e.g., a pressure of 40 to 130 MPa per unit cross-sectional area (1 cm$^3$) of the positive electrode pellets 2a), to press-mold the positive electrode pellets 2a.

Here, the cross-sectional area is an area of a cross section of the positive electrode pellets 2a perpendicular to the axis direction thereof (i.e., the direction X). In such a manner, the hollow cylindrical positive electrode 2 disposed in close contact with the battery case 1 is obtained.

In the process of inserting the pin 73 in the hollow portions of the positive electrode pellets 2a, there is a possibility that the side of the pin 73 hits the inner wall of the positive electrode pellet 2a to cause part of the positive electrode pellet 2a to be separated therefrom and drop on the bottom (the intermediate portion) of the battery case 1. Even when a fragment of the positive electrode pellet drops on the intermediate portion 12 of the battery case 1, the fragment of the positive electrode pellet can move to the recessed portion defined by the terminal portion 13, without remaining on the intermediate portion 12, since the intermediate portion 12 is provided with the inclined surface 12a. This can eliminate the possibility that the separator 4 is placed on the fragment of the positive electrode pellet.

This also can eliminate the possibility that in press-molding the positive electrode pellets 2a, the pin 73 presses the fragment of the positive electrode pellet, and fine creases due to the fragment of the positive electrode pellet are formed on the outer bottom surface of the battery case, thus causing no damage on the appearance of the intermediate portion 12 of the battery case 1.

[Step (4): Insertion of Separator]

An example of the step (4) is described below.

Figure 6:
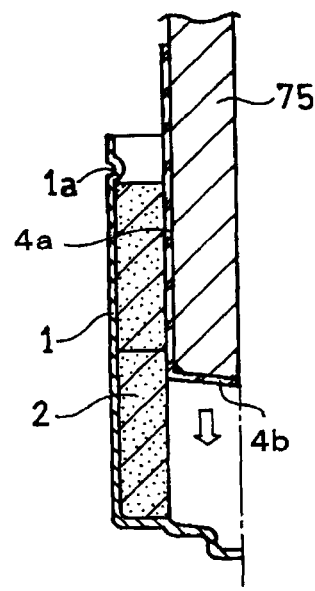
FIG. 6 is a schematic cross-sectional view showing how a separator is inserted in the battery case.

A non-woven fabric is wound several times around a cylindrical jig 75 shown in FIG. 6, to form the cylindrical separator 4a with a thickness, for example, 0.15 to 1.50 mm. For example, a mixed non-woven fabric mainly composed of polyvinyl alcohol fibers and rayon fibers is used as the non-woven fabric. For example, the cylindrical separator 4a with a thickness of 1.0 mm is obtained by winding layered two non-woven fabrics each having a thickness of 0.25 mm around the jig two times.

As shown in FIG. 6, the bottom separator 4b is placed on the end of the jig 75 around which the cylindrical separator 4a is wound. The jig 75 is inserted together with the cylindrical separator 4a and the bottom separator 4b into the hollow portion of the positive electrode 2. In this insertion, almost all of the bottom separator 4b is placed on the lower surface of the jig 75, and in order to stably insert and position the bottom separator 4b, the rim of the bottom separator 4b is placed on the side surface of the jig 75 so as to overlap with the lower end of the cylindrical separator 4a. In such a manner, the cylindrical separator 4a is disposed in contact with the inner wall of the positive electrode 2, and the bottom separator 4b is disposed on the bottom of the battery case 1.

The end of the jig 75 is of a conical shape and has a shape corresponding to the shape of the bottom of the battery case 1. As such, the bottom separator 4b is disposed along the step portion 14 and the inclined surface 12a of the intermediate portion 12.

The bottom separator 4b has a conical portion to be disposed on the bottom of the battery case and a raised portion that extends upwardly from the periphery of the conical portion along the outer surface of the lower end of the cylindrical separator. The conical portion is inclined so as to correspond to the incline of the intermediate portion. Since the conical portion protrudes downwardly, the filling amount of the negative electrode can be increased, which can improve the discharge characteristics.

In order to shape the bottom separator 4b so as to correspond to the shape of the battery case 1 more easily, namely, to stably form the conical portion more easily when inserted into the battery case 1, the bottom separator 4b is preferably made of a sheet obtained by laminating a non-woven fabric made of polyvinyl alcohol-based synthetic fibers on one surface or both surfaces of a microporous thin film (e.g., regenerated cellulose) of an approximate regular polygonal shape (preferably an approximate regular square shape) or an approximate circular shape.

In view of the strength and the flexibility of the bottom separator 4b, the thickness of the bottom separator 4b is preferably 50 to 250 μm. When the thickness of the bottom separator 4b is more than 250 μm, the flexibility of the bottom separator deteriorates, which may makes it difficult to stably form the conical portion so as to correspond to the shape of the bottom having an inclined surface. When the thickness of the bottom separator 4b is less than 50 μm, the strength is reduced, which may cause damage on the separator when inserted, or other troubles.

In view of preventing displacement of the bottom separator 4b and stably forming the shape of the bottom separator 4b (the conical portion), the height of the raised portion is preferably 2 to 3 mm.

In the process of inserting the separator 4, there is a possibility that, while the separator 4 is being inserted together with the jig 75, the side surface thereof hits the inner wall of the positive electrode 2 to cause part of the positive electrode 2 to be separated therefrom and drop on the bottom of the battery case 1. Even when a fragment of the positive electrode drops on the intermediate portion 12 of the battery case 1, the fragment of the positive electrode can move to the recessed portion defined by the terminal portion 13, without remaining on the intermediate portion 12 of the battery case 1. Therefore, the separator 4 will not be placed on the fragment of the positive electrode.

[Step (5): Injection of Electrolyte]

After the separator 4 has been disposed, an alkaline electrolyte is injected into the battery case. This allows the separator 4 to be impregnated with the alkaline electrolyte.

[Step (6): Filling of Negative Electrode]

The gelled negative electrode 3 is filled in the bottomed cylindrical separator 4. The negative electrode 3 is prepared by adding a gelling agent and an alkaline electrolyte to the negative electrode active material in a predetermined ratio. The gelling agent may be, for example, sodium polyacrylate. The adding amount of the gelling agent is preferably 0.5 to 2 parts by weight per 100 parts by weight of the negative electrode active material. The adding amount of the alkaline electrolyte is preferably 40 to 60 parts by weight per 100 parts by weight of the negative electrode active material.

[Step (7): Sealing]

Prior to the step (7), first, a groove is formed on the outer surface of the battery case 1 near the opening end thereof, to form a step portion 1a protruding inwardly of the battery case 1. The step portion 1a is preferably provided at a timing after the positive electrode pellets 2a have been brought into close contact with the battery case 1 and before the separator 4 is inserted (i.e., before the negative electrode and the separator are disposed). By forming the groove at this timing, the occurrence of troubles in forming a groove, such as spilling of the negative electrode out of the battery case, contact of the positive electrode and the negative electrode to each other, and displacement of the separator, can be prevented.

Secondly, the sealing unit 9 is prepared. Specifically, the sealing unit 9 is obtained by welding the head 6a of the negative electrode current collector 6 to the flat portion 7a at the center of the negative electrode terminal plate 7, and inserting the shank 6b of the negative electrode current collector 6 in the through-hole provided in the central cylindrical portion 5a of the resin gasket 5.

The sealing unit 9 is mounted at the opening of the battery case 1 such that the outer circumferential cylindrical portion 5b of the sealing unit 9 is supported on the step portion 1a of the battery case 1. Simultaneously, the shank of the negative electrode current collector 6 is inserted into the negative electrode 3. The opening end of the battery case 1 is crimped over the fringe 7b at the periphery of the negative electrode terminal plate 7 with the outer circumferential cylindrical portion 5b of the gasket 5 interposed therebetween, to seal the opening of the battery case 1.

In the step (7), the lower surface of the sealing unit 9 (the gasket 5) is brought into contact with the upper end of the cylindrical separator 4.

The following trouble may occur if a fragment of the positive electrode stays on the intermediate portion: In inserting the separator, the bottom separator is placed on the fragment of the positive electrode, resulting in failure of proper positioning of the separator. If the separator is not positioned properly, an excessive pressure is applied to the upper end of the cylindrical separator by the sealing unit (the gasket), causing the alkaline electrolyte impregnated in the separator to be forced out of the battery case.

If the alkaline electrolyte is forced out of the battery case, the amount of the alkaline electrolyte in the alkaline battery is decreased, which may result in deterioration in the battery performance. In addition, the alkaline electrolyte may attach on the outer surface of the battery case.

The prevent invention can prevent the occurrence of such troubles, since it is configured such that no fragment of the positive electrode will stay on the intermediate portion.

Embodiment 2

Figure 7:
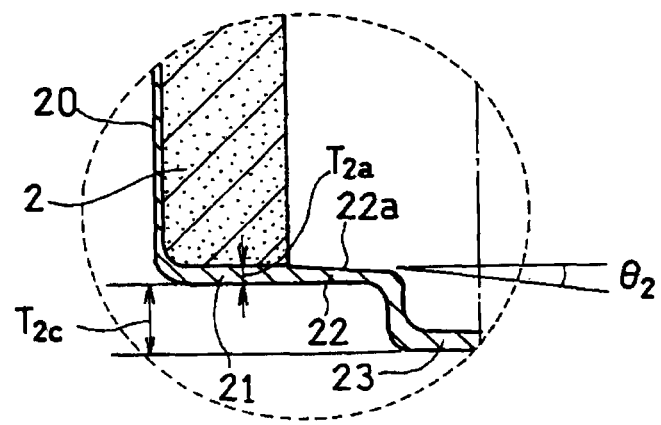
FIG. 7 is a relevant-part cross-sectional view of an alkaline battery according to Embodiment 2 of the invention.

FIG. 7 is an enlarged relevant-part cross-sectional view showing the vicinity of the bottom of an alkaline battery according to this embodiment. Description other than that of the shape of the bottom of the battery case is omitted because it overlaps with the description in Embodiment 1.

The bottom of a battery case 20 includes: an annular base portion 21 for supporting the positive electrode 2; an annular intermediate portion 22 provided inwardly of the base portion 21, for supporting the bottom separator 4b; and a cylindrical terminal portion 23 protruding downwardly (i.e., outwardly) from the intermediate portion 22.

The intermediate portion 22 has an inclined surface 22a on the inner bottom surface of the battery case 20, the inclined surface being inclined downwardly (i.e., outwardly) from the base portion 21 toward the terminal portion 23.

The lower surface of the intermediate portion 22 is not inclined with respect to a plane perpendicular to the direction X, and is parallel to the lower surface of the base portion 21 and flush therewith. By configuring as above, the terminal portion 23 and the inclined surface 22a can be formed in the battery case 20 with a large internal volume ensured.

The thickness of the intermediate portion 22 becomes smaller as approaching to the terminal portion 23. The thickness of the intermediate portion 22 is preferably 0.22 to 0.25 mm, in view of the internal volume and strength of the battery case.

An inclined angle $\theta_2$ of the inclined surface 22a relative to a plane perpendicular to the direction X is preferably 2 to 5°. When the inclined angle $\theta_2$ is less than 2°, the degree of inclination is insufficient, which may cause foreign matters to remain on the intermediate portion 22. When the inclined angle $\theta_2$ is more than 5°, the thickness of the intermediate portion 22 in the terminal portion 23 side becomes small, which may reduce the strength of the intermediate portion 22.

The thickness $T_{2a}$ of the base portion 21 is preferably 0.25 to 0.30 mm, in view of the strength and internal volume of the battery case.

The height $T_{2c}$ of the terminal portion 23 measured from the base portion 21 is preferably 1.2 to 1.6 mm, in view of the internal volume of the battery case.

The battery case of this embodiment can be formed, for example, in the same manner as the battery case of Embodiment 1, except that the shape of the protrusion of the punch 85 is changed to a shape corresponding to the inner bottom surface of the battery case 20 shown in FIG. 7, and the shape of the recess of the die 86 is changed to a shape corresponding to the outer bottom surface of the battery case 20 shown in FIG. 7.

Embodiment 3

Figure 8:
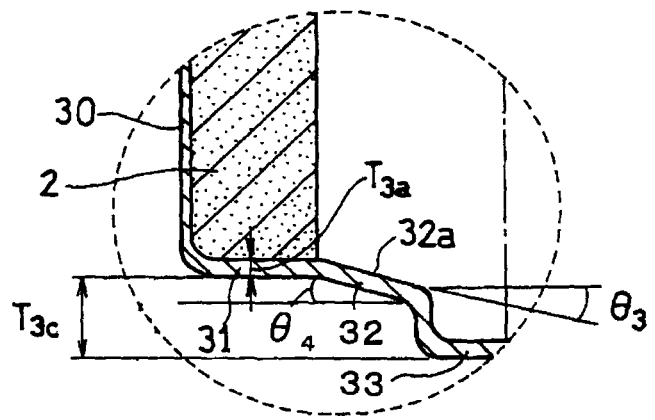
FIG. 8 is a relevant-part cross-sectional view of an alkaline battery according to Embodiment 3 of the invention.

FIG. 8 is an enlarged relevant-part cross-sectional view showing the vicinity of the bottom of an alkaline battery according to this embodiment. Description other than that of the shape of the bottom of the battery case is omitted because it overlaps with the description in Embodiment 1.

The bottom of a battery case 30 includes: an annular base portion 31 for supporting the positive electrode 2; an annular intermediate portion 32 provided inwardly of the base portion 31, for supporting the bottom separator 4b; and a cylindrical terminal portion 33 protruding downwardly from the intermediate portion 32.

The intermediate portion 32 has an inclined surface 32a on the inner bottom surface of the battery case 30, the inclined surface being inclined downwardly from the base portion 31 toward the terminal portion 33.

The lower surface of the intermediate portion 32 is inclined by the same angle as the upper surface thereof. In other words, the thickness of the intermediate portion 32 is constant from the base portion 31 side toward the terminal 33 side. By configuring as above, when the battery is mounted on a device, it is possible to prevent an end portion of an outer label provided on the peripheral portion (the base portion 31) of the bottom of the battery case from getting snagged on the device.

An inclined angle $\theta_3$ of the inclined surface 32a relative to a plane perpendicular to the direction X is preferably 2 to 15°. When the inclined angle $\theta_3$ is less than 2°, the degree of inclination is insufficient, which may cause foreign matters to remain on the intermediate portion 32. When the inclined angle $\theta_3$ is more than 15°, the height of the bottom of the battery case is increased, and the volume in the battery case (the filling volume of the positive electrode and the negative electrode) is reduced. In order to obtain a high capacity battery, the inclined angle $\theta_3$ is more preferably 2 to 10°.

An inclined angle $\theta_4$ of the lower surface of the intermediate portion 32 relative to a plane perpendicular to the direction X is preferably 2 to 15°, and more preferably 2 to 10°. The inclined angle $\theta_4$ is substantially the same as the inclined angle $\theta_3$.

The thickness $T_{3a}$ of the base portion 31 is preferably 0.25 to 0.30 mm, in view of the strength and internal volume of the battery case.

The height $T_{3c}$ of the terminal portion 33 measured from the base portion 31 is preferably 1.2 to 1.8 mm, in view of the internal volume of the battery case.

The battery case of this embodiment can be formed, for example, in the same manner as the battery case of Embodiment 1, except that the shape of the protrusion of the punch 85 is changed to a shape corresponding to the inner bottom surface of the battery case 30 shown in FIG. 8, and the shape of the recess of the die 86 is changed to a shape corresponding to the outer bottom surface of the battery case 30 shown in FIG. 8.

Embodiment 4

Figure 9:
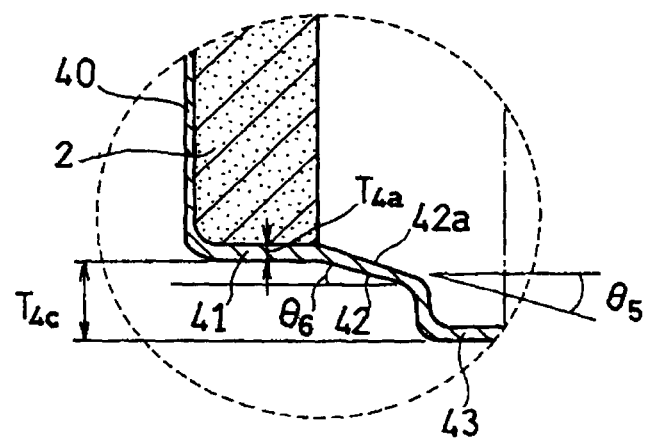
FIG. 9 is a relevant-part cross-sectional view of an alkaline battery according to Embodiment 4 of the invention.

FIG. 9 is an enlarged relevant-part cross-sectional view showing the vicinity of an alkaline battery according to this embodiment. Description other than that of the shape of the bottom of the battery case is omitted because it overlaps with the description in Embodiment 1.

The bottom of a battery case 40 includes: an annular base portion 41 for supporting the positive electrode 2; an annular intermediate portion 42 provided inwardly of the base portion 41, for supporting the bottom separator 4b; and a cylindrical terminal portion 43 protruding downwardly from the intermediate portion 42.

The intermediate portion 42 has an inclined surface 42a on the inner bottom surface of the battery case 40, the inclined surface being inclined downwardly from the base portion 41 toward the terminal portion 43.

The lower surface of the intermediate portion 42 is inclined with respect to a plane perpendicular to the direction X by an angle smaller than that of the inclined surface 42a. In other words, an inclined angle $\theta_6$ of the lower surface of the intermediate portion 42 with respect to a plane perpendicular to the direction X is smaller than an inclined angle $\theta_5$ of the inclined surface 42a with respect to a plane perpendicular to the direction X. As such, the thickness of the intermediate portion 42 is decreased from the base portion 41 side toward the terminal 43 side.

The thickness of the intermediate portion 42 is preferably 0.22 to 0.25 mm, in view of the strength and internal volume of the battery case.

The inclined angle $\theta_5$ is preferably 2 to 15°. When the inclined angle $\theta_5$ is less than 2°, the degree of inclination is insufficient, which may cause foreign matters to remain on the intermediate portion 42. When the inclined angle $\theta_5$ is more than 15°, the height of the bottom of the battery case is increased, and the volume in the battery case (the filling volume of the positive electrode and the negative electrode) is reduced. The inclined angle $\theta_5$ is more preferably 2 to 10°.

The difference ($\theta_5-\theta_6$) between the inclined angle $\theta_5$ and the inclined angle $\theta_6$ is preferably 1 to 3°, in view of the processability of the battery case.

The thickness $T_{4a}$ of the base portion 41 is preferably 0.25 to 0.30 mm, in view of the strength and internal volume of the battery case.

The height $T_{4c}$ of the terminal portion 43 measured from the base portion 41 is preferably 1.2 to 1.8 mm, in view of the internal volume of the battery case.

The battery case of this embodiment can be formed, for example, in the same manner as the battery case of Embodiment 1, except that the shape of the protrusion of the punch 85 is changed to a shape corresponding to the inner bottom surface of the battery case 40 shown in FIG. 9, and the shape of the recess of the die 86 is changed to a shape corresponding to the outer bottom surface of the battery case 40 shown in FIG. 9.

By reducing the curvature radius R of the corner of the protrusion 83a in the pre-forming punch 83 used in the step (B) (e.g., the curvature radius R is set to 0.5 mm or less), the corner of the protrusion 84a can be made thinner. By doing this, the thickness of the intermediate portion 42 can be easily controlled so as to decrease from the base portion 41 side toward the terminal 43 side in the step (C).

EXAMPLES

The invention is described below by way of Examples, but the invention is not limited thereto.

Example 1

An alkaline dry battery having the same configuration as shown in FIG. 1 was fabricated in the manner as described below.

(1) Production of Battery Case

A steel sheet (Ni-TOP steel sheet available from Toyo Kohan Co., Ltd., carbon content: 0.033 wt %, thickness: 0.40 mm) was prepared. A nickel layer (thickness: 2.0 μm) was formed by plating on each of both surfaces of the steel sheet, to give a nickel-plated steel sheet.

A disc was punched out of the nickel-plated steel sheet, and then was subjected to drawing, to form a first in-process product 82 (outer diameter: 21.5 mm, height: 15.5 mm), as shown in FIG. 3 (the step (A)).

The bottom inner surface of the first in-process product 82 was pressed with a pre-forming punch 83 having a truncated cone-shaped protrusion 83a (the diameter of the lower end surface 83b: 6.0 mm, height: 2.0 mm) formed at the center of the pressure-applying surface, as shown in FIG. 3, and thus a second in-process product 84 with a truncated cone-shaped protrusion portion 84a (the diameter A of the inner bottom surface: 6 mm) was obtained (the step (B)).

A punch 85 was inserted into the second in-process product 84 through the opening thereof, as shown in FIG. 3, to allow the second in-process product 84 to be continuously subjected to drawing by two drawing dies and ironing by three ironing dies, and then to press-mold the protruding portion 84a of the second in-process product 84 by using the punch 85 and a die 86 (the step (C)).

In such a manner, a battery case 1 (outer diameter: 13.8 mm, height: 50 mm) having the bottom shown in FIG. 2 (thickness $T_{1a}$ of base portion: 0.4 mm, height $T_{1b}$ of step portion 14 measured from base portion 11: 0.2 mm, inclined angle $\theta_1$: 3°, height $T_{1c}$ of terminal portion 13 measured from base portion 11: 1.6 mm), and the side (thickness $T_{1d}$: 0.15 mm) was produced.

The diameter A of the inner bottom surface of the protruding portion 84a of the second in-process product 84 was 6 mm. The outer diameter B of the terminal portion 13 was 5.1 mm. The height C ($=T_{1c}-T_{1b}$) of the terminal portion 13 measured from the bottom portion 12 was 1.4 mm. That is, (B+C)/A was 1.08.

Graphite-containing paste (Varniphite available from Nippon Graphite Industries, Ltd.) was applied onto the inner side surface and the inner bottom surface of the battery case 1, and dried, to form a carbon coating. The graphite-containing paste was applied in an amount of 1 mg per $cm^2$ of the inner surface of the battery case.

(2) Fabrication of Battery

The battery case produced in the above was used to fabricate a battery as shown in FIG. 1 in the following procedures.

Electrolytic manganese dioxide powder (purity of manganese dioxide: 92 wt %, average particle size: 48 μm, content of particles of 200 μm or larger in diameter: 0.1 wt %) serving as the positive electrode active material, and graphite powder (average particle size: 8 μm) serving as the conductive agent were mixed in a ratio of 93:7 by weight. The resultant mixture was mixed with an alkaline electrolyte in a ratio of 100:3 by weight, stirred sufficiently, and then compacted into flakes. An aqueous solution containing potassium hydroxide (concentration: 35 wt %) and zinc oxide (concentration: 2 wt %) was used as the alkaline electrolyte. The flake positive electrode material mixture was then crushed into granules. The resultant granules were sieved, and 10 to 100 mesh size granules were press-molded into a hollow cylindrical shape, to prepare positive electrode pellets 2a.

A lower molding punch 72 was inserted in the hollow portion of a hollow cylindrical cartridge 71, as shown in FIG. 4. The battery case 1 was placed on the lower molding punch 72 in the hollow portion of the cartridge 71. At this time, the base portion 11 of the bottom of the battery case 1 was mounted on the lower molding punch 72.

Two of the positive electrode pellets 2a were inserted into the battery case 1. In the hollow portions of the positive electrode pellets 2a, a cylindrical pin 73 having a diameter smaller than the inner diameter of the positive electrode pellets 2a by 0.1 mm was inserted.

Subsequently, as shown in FIG. 5, while the pin 73 was inserted in the hollow portion of a cylindrical hollow upper molding punch 74, the positive electrode pellets 2a were pressed from above with the upper molding punch 74 at a pressure of 95 MPa per unit cross-sectional area (1 $cm^3$) of the positive electrode pellets 2a, to press-mold the positive electrode pellets 2a. Here, the cross-sectional area is an area of a cross section of the positive electrode pellets 2a perpendicular to the direction X. In such a manner, a hollow cylindrical positive electrode 2 disposed in close contact with the battery case 1 was obtained. The filling density of the manganese dioxide in the positive electrode 2 was 2.96 $g/cm^3$. A groove was then formed on the outer surface of the battery case 1 near the opening end thereof, to form a step portion 1a.

Around a cylindrical jig 75 shown in FIG. 6, layered two non-woven fabrics each having a thickness of 0.12 mm and being a mixed non-woven fabric mainly composed of polyvinyl alcohol fibers and rayon fibers were wound two times, to form a cylindrical separator 4a with a side thickness of 0.24 mm.

As shown in FIG. 6, a bottom separator 4b was placed on the end of the jig 75 around which the cylindrical separator 4b was wound. The jig 75 was inserted together with the cylindrical separator 4a and the bottom separator 4b into the hollow portion of the positive electrode 2, while the lower end of the cylindrical separator 4a was kept wrapped with the bottom separator 4b. In such a manner, the cylindrical separator 4a was disposed in contact with the inner wall of the positive electrode 2, and the bottom separator 4b was disposed on the bottom of the battery case 1. The separator 4 was thus arranged.

Here, the bottom separator 4b was prepared by cutting a 0.13-mm-thick sheet made of a thin film of regenerated cellulose (thickness: 0.03 mm) with a non-woven fabric of polyvinyl alcohol fibers (thickness: 0.05 mm) laminated on both surfaces thereof, into a regular square (size: 15 mm×15 mm) larger than the outer diameter of the cylindrical separator 4a. The height of the raised portion of the bottom separator 4b was 2 to 3 mm.

An alkaline electrolyte was poured into the separator 4. The alkaline electrolyte poured into the separator was an aqueous solution containing 35% by weight potassium hydroxide and 2% by weight zinc oxide.

After a predetermined period of time has passed, a gelled negative electrode 3 was filled in the separator 4. The negative electrode 3 was prepared by mixing a sodium polyacrylate serving as the gelling agent, an alkaline electrolyte, and zinc powder serving as the negative electrode active material in a ratio of 0.5:33:66.5 by weight. The alkaline electrolyte used here was an aqueous solution containing 35% by weight potassium hydroxide and 2% by weight zinc oxide.

A sealing unit 9 was prepared by welding a head 6a of a negative electrode current collector 6 to a flat portion 7a of a negative electrode terminal plate 7, and inserting one end of a shank 6b in the head 6a side of the negative electrode current collector 6 in the through-hole provided in a central cylindrical portion 5a of a nylon gasket 5.

The sealing unit 9 was mounted at the opening of the battery case 1 such that an outer circumferential cylindrical portion 5b of the gasket 5 in the sealing unit 9 was supported on the step portion 1a of the battery case 1. Simultaneously, the shank 6b of the negative electrode current collector 6 was inserted into the negative electrode 3.

The opening end of the battery case 1 was crimped over the fringe 7b at the periphery of the negative electrode terminal plate 7 with the outer circumferential cylindrical portion 5b of the gasket 5 interposed therebetween, to seal the opening of the battery case 1. The outer surface of the battery case 1 was covered with an external label 8. In such a manner, an AA alkaline battery (LR6) was fabricated.

Example 2

The thickness of the nickel-plated steel sheet was changed to 0.25 mm. The shape of the protrusion of the punch 85 was changed to a shape corresponding to the inner bottom surface of the battery case 20 shown in FIG. 7, and the shape of the recess of the die 86 was changed to a shape corresponding to the outer bottom surface of the battery case 20 shown in FIG. 7.

In the same manner as in Example 1 except the above, a battery case (outer diameter: 13.8 mm, height: 50 mm) having the bottom shown in FIG. 7 (thickness $T_{2a}$ of base portion: 0.25 mm, inclined angle $\theta_2$: 2°, height $T_{2c}$ of terminal portion 23 measured from base portion 21: 1.6 mm), and the side (thickness: 0.18 mm) was produced.

A battery was fabricated in the same manner as in Example 1, except that the battery case thus obtained was used.

Example 3

The thickness of the nickel-plated steel sheet was changed to 0.25 mm. The shape of the protrusion of the punch 85 was changed to a shape corresponding to the inner bottom surface of the battery case 30 shown in FIG. 8, and the shape of the recess of the die 86 was changed to a shape corresponding to the outer bottom surface of the battery case 30 shown in FIG. 8.

In the same manner as in Example 1 except the above, a battery case (outer diameter: 13.8 mm, height: 50 mm) having the bottom shown in FIG. 8 (thickness $T_{3a}$ of base portion: 0.25 mm, inclined angle $\theta_3$: 15°, inclined angle $\theta_4$: 15°, height $T_{3c}$ of terminal portion 33 measured from base portion 31: 1.6 mm), and the side (thickness: 0.18 mm) was produced.

A battery was fabricated in the same manner as in Example 1, except that the battery case thus obtained was used.

Example 4

The thickness of the nickel-plated steel sheet was changed to 0.25 mm. The shape of the protrusion of the punch 85 was changed to a shape corresponding to the inner bottom surface of the battery case 40 shown in FIG. 9, and the shape of the recess of the die 86 was changed to a shape corresponding to the outer bottom surface of the battery case 40 shown in FIG. 9.

In the same manner as in Example 1 except the above, a battery case (outer diameter: 13.8 mm, height: 50 mm) having the bottom shown in FIG. 9 (thickness $T_{4a}$ of base portion: 0.25 mm, inclined angle $\theta_5$: 10°, inclined angle $\theta_6$: 12°, height $T_{4c}$ of terminal portion 43 measured from base portion 41: 1.6 mm), and the side (thickness: 0.18 mm) was produced.

A battery was fabricated in the same manner as in Example 1, except that the battery case thus obtained was used.

Comparative Example 1

Figure 10:
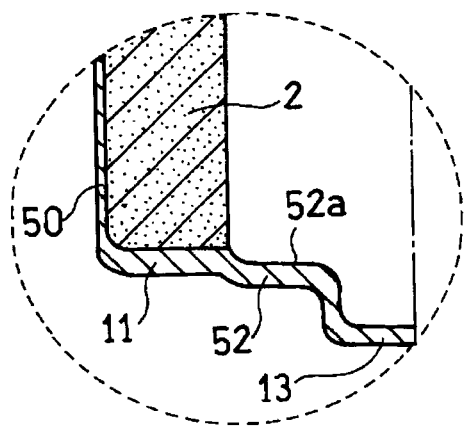
FIG. 10 is a relevant-part cross-sectional view of a conventional alkaline battery of Comparative Example 1.

The shape of the protrusion of the punch 85 was changed to a shape corresponding to the inner bottom surface of a battery case 50 shown in FIG. 10, and the shape of the recess of the die 86 was changed to a shape corresponding to the outer bottom surface of the battery case 50 shown in FIG. 10.

In the same manner as in Example 1 except the above, a battery case having the bottom shown in FIG. 10 was produced. Here, the bottom of the battery case 50 shown in FIG. 10 had the same configuration as that shown in FIG. 2, except that an intermediate portion 52 having an upper surface 52a perpendicular to the direction X was formed, that is, the inclined angle $\theta_1$ in FIG. 2 was changed to 0°.

A battery was fabricated in the same manner as in Example 1, except that the battery case thus obtained was used.

Comparative Example 2

The thickness of the nickel-plated steel sheet was changed to 0.25 mm. The shape of the protrusion of the punch 85 was changed to a shape corresponding to the inner bottom surface of a battery case 60 shown in FIG. 11, and the shape of the recess of the die 86 was changed to a shape corresponding to the outer bottom surface of the battery case 60 shown in FIG. 11.

Figure 11:
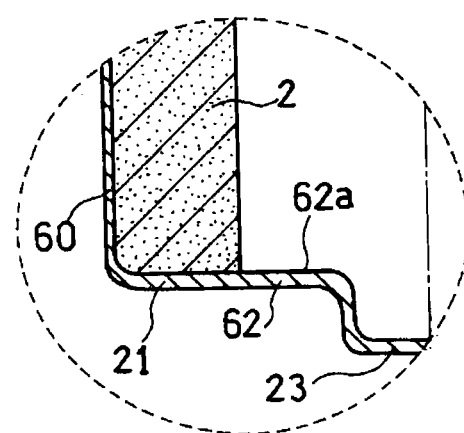
FIG. 11 is a relevant-part cross-sectional view of a conventional alkaline battery of Comparative Example 2.

In the same manner as in Example 1 except the above, a battery case having the bottom shown in FIG. 11 was produced. Here, the bottom of the battery case 60 shown in FIG. 11 had the same configuration as that shown in FIG. 7, except that an intermediate portion 62 having an upper surface 62a perpendicular to the direction X was formed, that is, the inclined angle $\theta_2$ in FIG. 7 was changed to 0°.

A battery was fabricated in the same manner as in Example 1, except that the battery case thus obtained was used.

[Evaluation]
(1) Separator Insertion Height Test

The position of the upper end of the cylindrical separator was examined after the separator has been inserted in the battery case, in order to check whether or not the separator was placed properly in the above battery fabrication process.

Specifically, a fiber sensor was used to detect the amount of light reflected by the upper end of the cylindrical separator. The number of tested samples was 10000.

When the separator was not inserted properly, in other word, when the position of the cylindrical separator was raised because the bottom separator was placed on foreign matters present on the intermediate portion of the bottom of the battery case, the light emitted from the fiber sensor was blocked by the upper end of the cylindrical separator, and thus the amount of reflected light was increased.

When no foreign matter was present on the intermediate portion of the bottom of the battery case, and the separator was inserted properly, the light emitted from the fiber sensor was not blocked by the upper end of the cylindrical separator, and thus the amount of reflected light was decreased.

(2) Appearance Test

The bottom of the fabricated battery was visually inspected whether or not there were fine creases around the terminal portion (intermediate portion) of the bottom. The number of tested samples was 1000.

The fine creases are resulted from that a fragment separated from the positive electrode material mixture dropped on around the terminal portion (intermediate portion) and remained there, and the fragment was pressed by the pressing jig in the process of press-molding the positive electrode material mixture in the battery case.

The evaluation results are shown in Table 1.

TABLE 1

|  | Number of separators inserted improperly/ Number of tested samples | Number of batteries with abnormal appearance/ Number of tested samples |
|---|---|---|
| Ex. 1 | 1/10000 | 0/1000 |
| Ex. 2 | 1/10000 | 1/1000 |
| Ex. 3 | 0/10000 | 0/1000 |
| Ex. 4 | 0/10000 | 0/1000 |
| Com. Ex. 1 | 6/10000 | 3/1000 |
| Com. Ex. 2 | 11/10000 | 6/1000 |

In the batteries of Examples 1 to 4 of the invention, the occurrence of improper separator insertion and abnormal appearance was suppressed as compared to the batteries of Comparative Examples 1 and 2, which indicates that the invention can achieve excellent reliability.

The alkaline battery of the present invention has excellent reliability, and therefore, is suitably applicable as a power source for electronic equipment such as portable devices and information devices.

Although the invention has been described in terms of the presently preferred embodiments, it is to be understood that such disclosure is not to be interpreted as limiting. Various alterations and modifications will no doubt become apparent to those skilled in the art to which the invention pertains, after having read the above disclosure. Accordingly, it is intended that the appended claims be interpreted as covering all alterations and modifications as fall within the true spirit and scope of the invention.

The invention claimed is:

1. An alkaline battery comprising a bottomed cylindrical battery case, a positive electrode of a hollow cylindrical shape disposed in contact with an inner surface of the battery case, a gelled negative electrode disposed in a hollow portion of the positive electrode, a separator interposed between the positive electrode and the negative electrode, and an alkaline electrolyte, wherein:

the separator includes a cylindrical separator disposed in contact with an inner side surface of the positive electrode, and a bottom separator covering an opening of the cylindrical separator in the bottom side of the battery case, a bottom of the battery case includes:

an annular base portion supporting the positive electrode and being in direct contact with a bottom of the positive electrode;

an annular intermediate portion provided inwardly of the base portion and supporting the bottom separator; and a terminal portion provided so as to protrude outwardly from the intermediate portion, and the intermediate portion has an inclined surface on an inner bottom surface of the battery case, the inclined surface being formed so as to incline outwardly from the base portion toward the terminal portion, and an inclined angle of the inclined surface relative to a plane perpendicular to the axis direction of the battery case is 2 to 15°.

2. The alkaline battery in accordance with claim 1, wherein the inclined angle is 2 to 10°.

3. The alkaline battery in accordance with claim 1, wherein the bottom of the battery case further includes a step portion provided between the base portion and the intermediate portion, and the inclined surface is formed from the step portion toward the terminal portion.

4. The alkaline battery in accordance with claim 3, wherein a height of the step portion is larger than a thickness of the bottom separator.

5. The alkaline battery in accordance with claim 3, wherein the inclined angle of the inclined surface relative to a plane perpendicular to the axis direction of the battery case is 2 to 5°.

6. The alkaline battery in accordance with claim 1, wherein the battery case is made of a steel sheet, and the steel sheet contains carbon in an amount of 0.02 to 0.05% by weight.

7. The alkaline battery in accordance with claim 1, wherein the inner bottom surface of the battery case has a carbon coating.

8. An alkaline battery comprising a bottomed cylindrical battery case, a positive electrode of a hollow cylindrical shape disposed in contact with an inner surface of the battery case, a gelled negative electrode disposed in a hollow portion of the positive electrode, a separator interposed between the positive electrode and the negative electrode, and an alkaline electrolyte, wherein:

the separator includes a cylindrical separator disposed in contact with an inner side surface of the positive electrode, and a bottom separator covering an opening of the cylindrical separator in the bottom side of the battery case, a bottom of the battery case includes:

an annular base portion supporting the positive electrode, the annular base portion being a continuous part from a side face of the bottomed cylindrical battery case with interposing a bent portion;

an annular intermediate portion provided inwardly of the base portion and supporting the bottom separator; and a terminal portion provided so as to protrude outwardly from the intermediate portion, and the intermediate portion has an inclined surface on an inner bottom surface of the battery case, the inclined surface being formed so as to incline outwardly from the base portion toward the terminal portion, and an inclined angle of the inclined surface relative to a plane perpendicular to the axis direction of the battery case is 2 to 15°.

* * * * *